(12) United States Patent
Hayward et al.

(10) Patent No.: US 7,111,250 B1
(45) Date of Patent: Sep. 19, 2006

(54) IMAGE TRANSFER APPARATUS

(75) Inventors: Ken Hayward, Brockport, NY (US); Marc J. Krolczyk, Rochester, NY (US); Dawn M. Marchionda, Marion, NY (US); Thomas L. Wolf, Webster, NY (US); James S. Laird, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/364,630

(22) Filed: Jul. 30, 1999

(51) Int. Cl.
*G06F 13/00* (2006.01)

(52) U.S. Cl. .................. 715/826; 715/824; 358/1.15

(58) Field of Classification Search .................. 399/81; 345/811, 813, 817, 821, 824, 767, 768, 825–826, 345/744–747, 802, 841, 861; 703/1, 2, 16; 716/1, 2, 20; 715/826, 824, 825, 708, 811, 715/747, 745; 358/1.15
See application file for complete search history.

(56) References Cited

U.S. PATENT DOCUMENTS

| | | | |
|---|---|---|---|
| 5,084,875 A | 1/1992 | Weinberger et al. ........ 371/291 |
| 5,798,738 A | 8/1998 | Yamada .......................... 345/2 |
| 5,915,106 A * | 6/1999 | Ard ................................ 716/1 |
| 6,063,030 A * | 5/2000 | Vara et al. ................... 600/437 |
| 6,181,736 B1 * | 1/2001 | McLaughlin et al. ....... 375/222 |
| 6,266,059 B1 * | 7/2001 | Matthews et al. .......... 345/810 |
| 6,278,450 B1 * | 8/2001 | Arcuri et al. ............... 345/744 |
| 6,344,865 B1 * | 2/2002 | Matthews et al. .......... 345/815 |
| 6,353,444 B1 * | 3/2002 | Katta et al. ................. 345/716 |
| 6,373,507 B1 * | 4/2002 | Camara et al. ............. 345/825 |
| 6,415,026 B1 * | 7/2002 | Flood .................... 379/215.01 |
| 6,606,465 B1 * | 8/2003 | Mutoh et al. ................. 399/81 |
| 6,708,877 B1 * | 3/2004 | Blankenship et al. ....... 235/375 |
| 6,724,405 B1 * | 4/2004 | Matthews et al. .......... 345/773 |
| 6,891,633 B1 * | 5/2005 | Hayward et al. .......... 358/1.15 |

\* cited by examiner

*Primary Examiner*—Steven P. Sax
(74) *Attorney, Agent, or Firm*—Perman & Green, LLP

(57) ABSTRACT

An image transfer system for transferring an image from a first medium, comprising an image transfer apparatus and a computer. The image transfer apparatus has a scanner for scanning the image on the first medium, and a display. The computer is removably connected to the image transfer apparatus. The computer has a computer display. When the computer is connected to the image transfer apparatus, the computer has selectable features of an operating menu of the image transfer apparatus available for display on the computer display. At least one of the features is unavailable for selection in an image transfer apparatus menu available for display on the computer display when the computer is not connected to the transfer apparatus.

16 Claims, 6 Drawing Sheets

IMAGE TRANSFER APPARATUS

BACKGROUND OF THE INVENTION

1. Field of the Invention

The present invention relates to an image transfer system and, more particularly, to image transfer system comprising an image transfer device operably connected to a computer.

2. Prior Art

There are known examples in the prior art of image transfer systems comprising an image transfer device coupled to one or more computers. One such example is U.S. Pat. No. 5,798,738 which provides a copying machine print manager system which comprises a terminal connected to a copying machine. Generally, the copying machines in the prior art were capable of performing only a given set of functions regardless of whether the copying machine was or was not connected to a computer.

One object of the present invention is to provide a user interface (UI) and software solution for providing extended and enhanced feature suite to an image transfer device based on the connection of the device to a personal computer (PC) which enables the device to leverage greater memory and processing power. Another object of the present invention is to have selectable features of the extended suite made visible/available in a client UI when the image transfer device is attached to the PC. The device driver software would be "smart" enough to recognize the capabilities of the output device when coupled with the PC, and extended features and functions could become available to the user once the automated on install assessment is made.

SUMMARY OF THE INVENTION

In accordance with a first embodiment of the present invention, an image transfer system for transferring an image from a first medium is provided. The image transfer system comprises an image transfer apparatus, and a computer. The image transfer apparatus has a scanner for scanning the image on the first medium, and a display. The computer has a computer display. The computer is removably connected to the image transfer apparatus. When the computer is connected to the image transfer apparatus, the computer has selectable features of an operating of the image transfer apparatus available for display on the computer display. At least one of the features is unavailable for selection in an image transfer apparatus operating menu which is available for display on the computer display when the computer is not connected to the transfer apparatus.

In accordance with a second embodiment of the present invention, an image transfer system is provided. The image transfer system comprises an image transfer device, and a computer removably connected to the image transfer device. The image transfer device has a reader for reading an image on a medium. The computer has a user interface and a computer display. When the computer is connected to the image transfer device, the computer has a first image transfer device operating menu with selectable features for operating the image transfer device available for display on the computer display. The user interface of the computer is adapted to allow a user to select the selectable features displayed on the computer display. When the computer is not connected to the image transfer apparatus, the computer has a second image transfer device operating menu available for display on the computer display with at least one of the selectable features of the first menu being unselectable in the second menu.

In accordance with the third embodiment of the present invention, an image transfer device for transferring an image from a medium is provided. The image transfer device comprises a controller, a reader, and a connector. The reader is operably connected to the controller for reading the image on the medium. The connector is connected to the controller. The connector allows a computer to be connected to the image transfer device. Extended features of an enhanced operating menu of the image transfer device are available to be displayed on a computer display. The extended features are accessible for selection by a user from the computer display when the computer is connected to the connector. The extended features are inaccessible for selection by the user from the computer display when the computer is not connected to the connector.

In accordance with a first method of the present invention, a method for enhancing operating features of an image transfer device is provided. The method comprises the steps of providing the image transfer device with a connector for connecting a computer to the image transfer device, connecting the computer to the image transfer device, and with the computer displaying extended features of an enhanced operating menu for operating the image transfer device. The computer has a computer display and a user interface. The extended features of the enhanced operating menu are displayed on the computer display. The extended features of the enhanced operating menu of the image transfer device on the computer display are selectable by a user using the user interface of the computer. The extended features are selectable when the computer is connected to the image transfer device. The extended features are unselectable when the computer is not connected to the image transfer device.

In accordance with a second method of the present invention, a method for transferring information from a first medium is provided. The method comprises the steps of providing an image transfer device having a scanner for reading an image on the first medium, reading the image on the first medium with the scanner, sending the image read by the scanner from the transfer device to a computer connected to the transfer device, automatically manipulating the image by the computer, automatically sending the manipulated image from the computer to the transfer device and transferring the manipulated image by the transfer device to a second medium. The manipulated image is automatically sent from the computer to the transfer device without user interaction with the computer.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
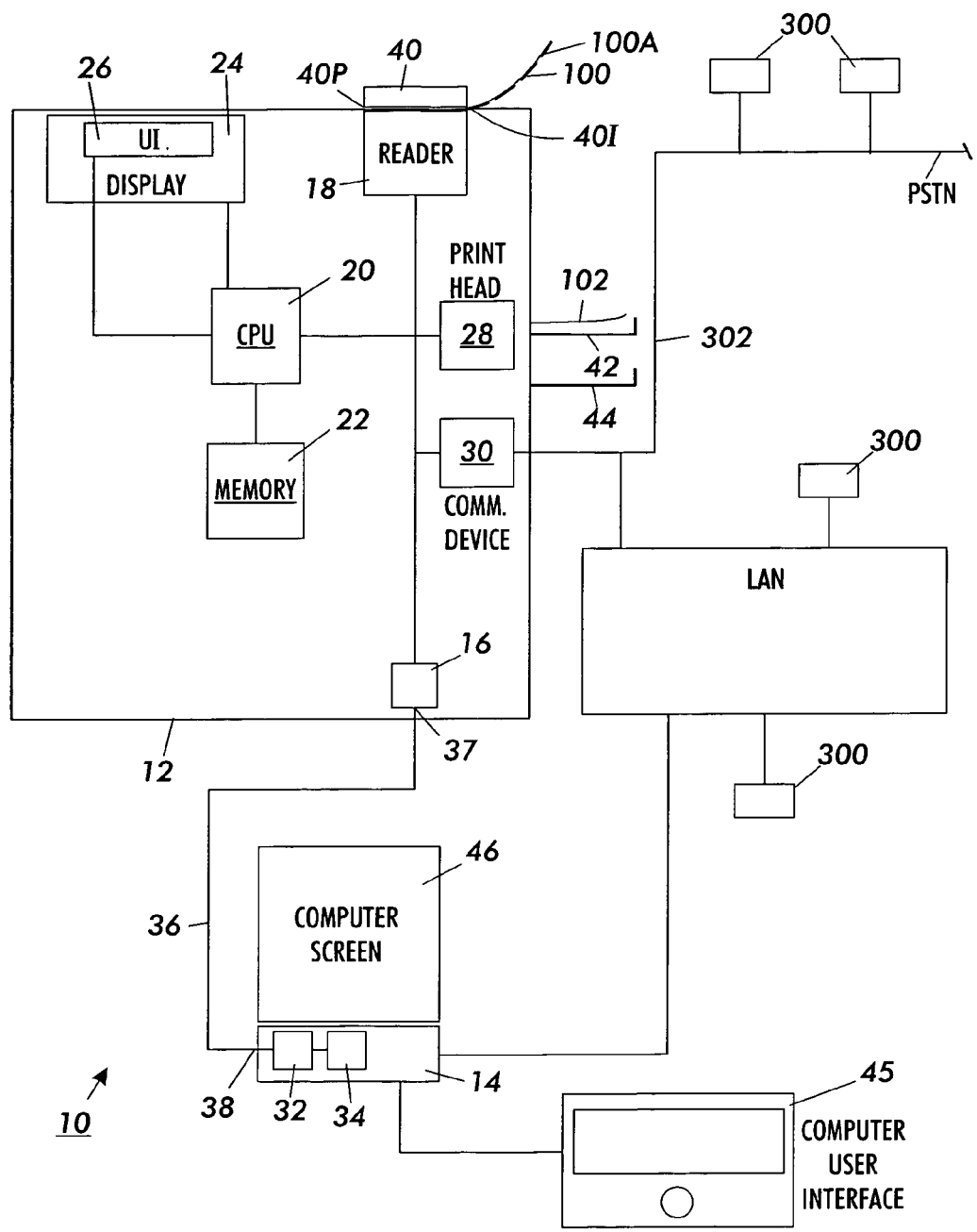
FIG. 1 is a schematic diagram of an image transfer system incorporating features of the present invention.

Referring to FIG. 1, there is shown an exploded perspective view of an image transfer system 10 incorporating features of the present invention. Although the present invention will be described with reference to the single embodiment shown in the drawings, it should be understood that the present invention can be embodied in many alternate forms of embodiments. In addition, any suitable size, shape or type of elements or materials could be used.

Still referring to FIG. 1, the image transfer system 10 generally includes an image transfer device 12 and a computer 14. The computer 14 is connected to the image transferring device 12 by a cable 36 which is removably mated to a connector 16 of the device 12. The image transferring device 12 generally comprises a reader 18, a central processing unit (CPU) 20, a memory 22, a display 24 and a user interface (UI) 26. Preferably, the device 12 also includes a print head 28 and a communication device 30. The reader 18 is adapted to read a printed image on medium 100. The print head 28 is adapted to print an image on medium 102. The communication device 30 is adapted to transmit and receive images between the device 12 and one or more image transfer devices 300 located at remote locations. The reader 18, print head 28, and communication device 30 are connected so that the reader 18 can send information to both the print head 28 and the communication device 30. The communication device 30 can also send information to the print head 28. The CPU 20 is connected to the reader 18, the print head 28, and the communication device 30. The CPU 20 is capable of controlling the operation of the reader 18, the print head 28, and the communication device 30 in response to commands from a user. The user enters commands via the user interface 26 which is connected to the CPU 20. The user selects the commands from a menu displayed on the display 24 of the device 12. The CPU 20 of the image transfer device 12 is connected to the connector 16. The reader 18, print head 28, and communication device 30 are also connected to connector 16. The computer 14 generally includes a processor 32, a memory 34, a display or screen 46, and a user interface 45. The computer 14 may be connected by a local area network to other computers (not shown). When the computer 14 is connected via cable 36 to the connector 16, the CPU 20 can access the computer processor 32 and memory 34. Also, when the cable 36 is connected to the connector 16, the reader 18, the print head 28, and the communication device 30 are connected to the computer 14. This allows the reader 18 to send information to the computer 14, and allows the computer 14 to send information to the print head 28 and communication device 30 of the image transferring device 12. The computer processor 32 can also send information to the CPU 20 of the device 12. The image transferring device may include a computer printer, a copier, a facsimile or an optical scanner capability. In the preferred embodiment, the image transferring device 12 performs as a multi-function device which includes one or more of the aforementioned capabilities. In alternate embodiments the device may have more or less than these four capabilities. The multi-function device 12 of the present invention is capable of operating, at least partially, as a stand alone device when the computer 14 is not connected to the device 12, such as only a copier and/or only a facsimile machine. When the computer 14 is connected to the device 12, the device 12 may use the software and memory of the computer 14 to perform one or more of the enhanced or extended capabilities of the device 12. In addition, a user may remotely operate the device 12 from the computer 14 to perform one or more of the extended capabilities as will be described in greater detail below.

In particular, the reader 18 on the device 12 is preferably an optical scanner capable of reading an image or pattern embodying information which is disposed on sheet medium 100. In the preferred embodiment, the device 12 has an input area 40 in which the user places the sheet medium 100 for reading by the reader 18. The input area generally includes a cover 41 for covering a glass platen (not shown) upon which the user places the sheet medium 100 with the image face 100A down. The user may place the sheet medium 100 directly on the glass platen or may use a roller system (not shown) within the cover 41 to feed the sheet medium 100 to the glass platen from an input port 40I. The reader 18 is generally located below the glass platen of the input area 40. The reader 18 is orientated relative to the glass platen to scan the surface 100A of the sheet medium 100 placed against the glass platen. In the preferred embodiment, the reader 18 is a movable reader which operates to optically scan the surface 100A of the sheet medium 100 placed on the glass platen. For example, the reader 18 may travel along the length of the sheet medium 100 while scanning laterally across the face 100A of the sheet medium 100. In alternate embodiments, the device may have a static reader. In that case, a roller system may transport the sheet medium from the input area over the static reader in order for the reader to read the image on the sheet medium. After the reader 18 has finished reading the images on the sheet medium 100, the sheet medium can be removed manually or output by the roller system (not shown) to an output port 40P of the device 12. During operation, the reader 18 converts the printed image on the sheet medium 100 to binary encoded data which can be sent electronically, as directed by the CPU 20 to the print head 28, or the communication device 30.

The print head 28 is generally capable of receiving an image in the form of binary data and of printing the image on sheet medium 102. The device 12 has an input area 42 for placing sheet medium 102 prior to printing. An output area 44 holds the sheet medium 102 processed by the print head 28. A sheet medium transport system (not shown), such as a roller system for example, inside the device 12 withdraws sheet medium 102 from the input area 42 and transports the sheet medium 102 to the print head 28. The print head 24 prints the image on the sheet medium 102 and the transport system then moves the sheet medium 102 to the output area 44 of the device 12.

The communication device 30 is generally a facsimile transceiver or modem which is coupled to a communication line 302 connecting the device 12 to other image transfer devices 300. Preferably, the communication line 302 is a land line such as for example a public switched telephone network (PSTN) or a local area network (LAN) line to which the other transfer devices 300 are connected. However, in alternate embodiments, the communication device may include the capability to communicate with the other image transfer devices over a cellular telephone network. The communication device 30 is otherwise adapted to receive the binary data of the image read by the reader 18 and generate signals transmitting the image over the communication line 302 to one or more designated image transfer devices 300. The image transfer devices 300 which receive the signals may then reproduce the transmitted image. The communication device 30 can in turn receive images over the communication line 302 from the image transfer devices 300. The communication device 30 demodulates the signals forming the images and then may send the data as directed by the CPU 20 to the print head 28 for printing the images on sheet medium 102.

The connector 16 of the image transfer device 12 is preferably a universal bus connector. In alternate embodiments, the connector of the image transfer device may be a parallel port connector. The cable 36 for connecting the computer 14 to the device 12 has a connectorized end 37 adapted to be removably mated to the serial port connector 16. The opposite end 38 of the cable 36, which end is preferably also connectorized, is connected to a suitable input/output port (not shown) of the computer 14. When the computer 14 is connected via cable 36 to the device 12, image data can be sent from the reader 18 to the computer 14. In addition, when the computer 14 is connected to the device 12, the data of an image formed with the computer 14 can be sent from the computer 14 to the print head 28 of the device 12. Furthermore, image data generated with the computer 14 may also be sent to the communication device 30 for transmission over communication line 302 to one or more of the image transfer devices 300. Conversely, image data generated by the communication device 30 of images sent by one of the remote transfer devices 300, may be sent under the control of the CPU 20 from the communication device 30 to the computer 14. The CPU 20 is programmed to control the operation of the reader 18, the print head 28 and the communication device 30. The CPU 20 controls the operational sequence of the reader 18, print head 26 and communication device 30 as well as the flow of data therebetween. For example, when the image transfer device 12 is operating in a copier mode, the CPU 20 energizes the reader 18 to read the image on surface 100A of the sheet medium 100. The CPU 20 directs the data from the reader 18 to the print head 28 and queues the print head to print the image read by the reader 18 on sheet medium 102. Concurrent with this, the CPU also operates the transport system transporting the sheet medium 102 from the input area 42 to the print head 28 and then to the output area 44 of the device. When the device 12 is operating in a facsimile sending mode, the CPU 20 operates the communication device 30 to make a connection with selected remote devices 300. The CPU 20 then energizes the reader 18 to read the image on the sheet medium 100 and directs the data to the communication device 30 which sends the data to the remote device 300. In the facsimile standby mode, the CPU 20 operates the communication device 30 to respond to a connection signal from a remote device 300 and form a connection. The CPU 20 may then direct the demodulated image signal received by the communication device 30 to the print head 28 and queue the print head for printing the image on sheet medium 102. The CPU 20 also controls operations of the device 12 when the computer 14 is connected to the device. For instance, when the device 12 is in a scanner mode, the CPU 20 energizes the reader 18 and sends the image data from the reader to the computer. When the device 12 is in a printer mode, the CPU 20 queues the print head for printing and directs image data from the computer 14 to the print head 28.

Figure 2:
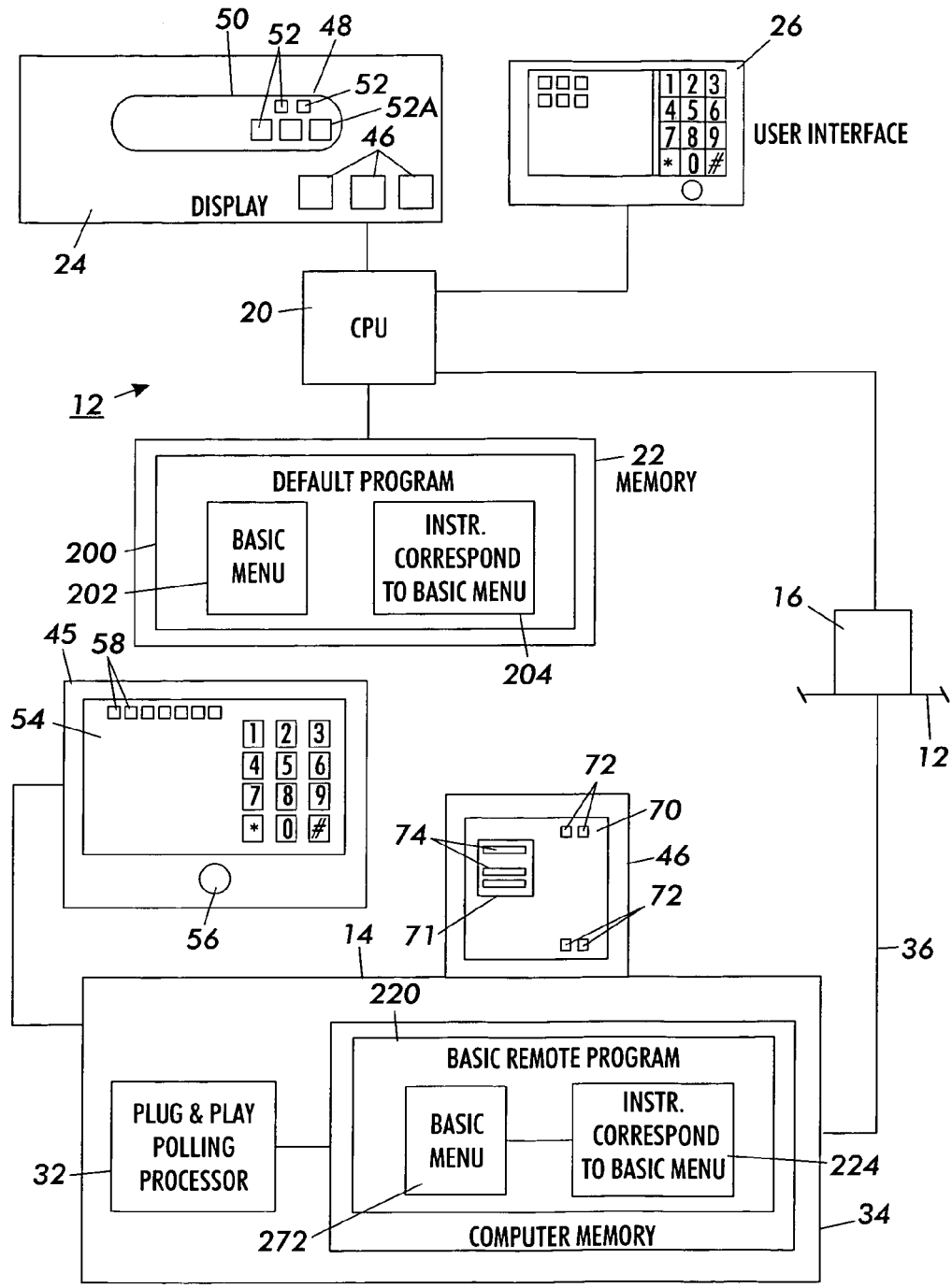
FIG. 2 is a schematic diagram showing a computer, and the display, user interface, processor, and memory of an image transfer device of the image transfer system shown if FIG. 1.

Referring now also to FIG. 2, the user may operate the image transfer device 12 from the display 24 and the user interface 26 of the device 12. Operation of the display 24 is controlled by the CPU 20. The CPU 20 is programmed to display an operating menu 48 on the display 24 of the transfer device 12. The CPU 20 may also be programmed to display other indicia on the display 24 to indicate various house-keeping functions of the device such as the occurrence of a paper jam or other malfunction for example. The operating menu comprises commands which designate functions of the device 12. The display 24 of the device 12 may include a touch display 50. The operating menu 48 may appear as command buttons 52 disposed on the touch display 50. The user may activate and deactivate, one or more of the command buttons 52 by touching the desired buttons 52 shown on the display 50.

The user may also activate or deactivate the command buttons 52 of the operating menu by using the user interface 26 of the device 12. The user may further operate the image transfer device 12 remotely from the computer 14 when the computer 14 is connected to the device 12. The computer processor 32 is generally programmed to display on the computer display 46 an operating menu 70 comprising features for remotely operating the image transfer device 12. The features of the operating menu 70 may be displayed by the computer processor 32 in any suitable format. For example, the features may be listed commands in a "pop-up" and/or "pull-down" menu 71, or the features may appear as command buttons 72 embedded in the computer display 46. The features of the operating menu may also be displayed, as shown in FIG. 2, as a combination of "pop-up" menu listed commands and command buttons 72 on the display 46. In the case the display uses a "pop-up" menu, the listed commands may be disposed therein as a series of command lines 74. The command lines 74 in the "pop-up" menu and the command buttons 72 have suitable indicia on the display 46 to indicate to a user which features for remotely operating the image transfer device 12 correspond to the respective command lines and buttons. The computer processor 32 is also programmed to enable selection of the command lines 74 and command buttons 72 on the display with the user interface 45 of the computer 14. The user interface 45 of the computer 14 is preferably a keyboard which generally includes an alpha-numeric keypad 54, a track ball 56 and function keys 58. In alternate embodiments, the user interface may also include a mouse in place of the track ball. The function keys 58 may be designated using macro-instructions to the computer processor 32 to correspond to command buttons 72 and/or command lines 74 on the computer display 46. The user may thus select one of the command buttons or lines 72, 74 by pressing the function keys 58 on the user interface 45 corresponding to the desired buttons or lines 72, 74. The track ball 56 allows the user to move a pointer or cursor (not shown) which the computer processor 32 displays on the computer display 46. Accordingly, the user may select one of the command buttons 72 or command lines 74 by moving the pointer to the desired button and striking an enter or register key (not shown) on the user interface 45 which activates or deactivates the command button or line 72, 74.

The computer processor 32 senses activation or deactivation of the command buttons or lines 72, 74 and changes the display 46 to shown that the selected buttons or lines 72, 74 have been activated or deactivated as appropriate. In the preferred embodiment, when the computer 14 is connected to the image transfer device 12 and one or more of the command buttons or lines 72, 74 are activated, the computer processor 32 sends an appropriate signal to the CPU 20. This signal identifies to the CPU 20 the commands corresponding to the command buttons 72 selected on the computer display 46. The CPU 20 in turn proceeds to control the operation of the device 12 in accordance with the received commands. In alternate embodiments, when a command button on the computer display is activated, the computer processor may also send program instructions to the device CPU programming the CPU to perform the operations corresponding to the menu features activated on the computer display. Deactivation of the command buttons and lines 72, 74 on the computer display 46 causes the computer processor 32 to signal to the CPU 20 of the device 12 that a command has been deactivated. The CPU 20 then deletes the corresponding operative commands from its programming.

The software used by the CPU 20 is stored in the memory 22 of the device 12. In addition to storing the software used by the CPU 20, the memory 22 may also have memory space for storing data sent from the reader 18, the communication device 30, or the computer 14 when the computer is connected to the device 12. In general, the software stored in the memory 22 includes a default or basic program 200 for operating the image transfer device 12. The basic program is loaded in the CPU 20 when the CPU 20 is initialized and the computer 14 is not connected via cable 36 to connector 16 of the device 12. The basic program 200 has a module 202 which defines the basic operating menu of the image transfer device 12. The basic program 200 also includes a program module 204 which provides instructions to the CPU 20 for controlling the functions of the device 12 corresponding to the commands within the basic operating menu. The basic operating menu in module 202 is generally available for display by the CPU 20 on the display 50 when the computer 14 is not connected to the device 12. The basic operating menu may also be displayed on the device display when the computer is connected to the device 12 but image transfer operations are to be performed without the aid of the computer.

One example of the features of the basic operating menu of the image transfer device 12 defined by program module 202 are listed in Table 1.

TABLE 1

| I. MODE | | | | |
|---|---|---|---|---|
| 1. COPIER | | | | |
| II. ORIGINAL TYPE | | | | |
| 1. AUTO* | 2. TEST | 3. PHOTO | | |
| III. MAINTENANCE | | | | |
| 1. CLEAN PRINT HEAD | 2. PRINT TEST PAGE | 3. ALIGN PRINT HEAD | 4. RESET PRINTER | 5. INK LEVELS |
| | | | | A. Black |
| | | | | B. Cyan |
| | | | | C. Magenta |
| | | | | D. Yellow |
| IV. PRINT DEMO | | | | |
| V. DEFAULTS | | | | |
| 1. Feature Defaults | 2. Program Time-out | 3. Sleep Mode | 4. Paper Size | 5. Reset Factory |
| A. Save new B. Reset | A. 60 sec.* B. 90 sec. | A. 5 min* B. 10 min | A. Letter* B. A4 | |

TABLE 1-continued

| I. MODE | | | | |
|---|---|---|---|---|
| VI. LANGUAGE | | | | |
| Language 1 | Language 2 | Language 3 | Language 4 | Language 5 |
| 2. FACSIMILE | | | | |
| II. ORIGINAL TYPE | | | | |
| 1. AUTO* | | 2. TEXT | | 3. PHOTO |
| III. TELEPHONE NUMBERS | | | | |
| NO. 1 | NO. 2 | NO. 3 | | NO. 4 |
| NO. 5 | NO>6 | NO>7 | | NO. 8 |
| V. DEFAULTS | | | | |
| 1. Feature Defaults | 2. AUTO REDIAL | 2. Program Time-out | 3. sleep Mode | 4. Paper Size |
| A. Save new B. Reset | A. 3 min* B. 5 min | A. 60 sec.* B. 90 sec | A. 5 min* B. 10 min | A. Letter* B. A4 |
| VI. LANGUAGE | | | | |
| Language 1 | Language 2 | Language 3 | Language 4 | Language 5 |

*Default Settings

As can be seen from Table 1, in the preferred embodiment, the structure of the basic operating menu is generally organized based on selection categories. Each selection category further includes one or more selection command options. For example, the basic operating menu in the preferred embodiment includes: selection category I "Mode"; selection category II "Original Type"; selection category III "Maintenance"; selection category IV "Print Demo"; selection category V "Defaults"; and selection category VI "Language". The "Mode" selection category includes command options for: 1) "Copier", and 2) "Facsimile" modes which respectively allow the user to select the operating mode of the device 12 as either a copier or facsimile. Selection category II "Original Type" includes: command option 1 "Auto"; command option 2 "Text"; and command option 3 "Photo", which allow the user to input the type of original to be read by the reader. Selection category III "Maintenance" includes command options 1–5 which allow the user to select between five device maintenance functions as labeled in Table 1. Selection category V "Defaults" of the basic operating menu listed in Table 1 includes command options 1–5, the first four of which have two settings as shown. Default settings are indicated by the * symbol in Table 1. Selection category VI "Language" of the "Copier" mode listed in Table 1, has command options 1–5 for controlling the display language. The "Facsimile" mode of the basic operating menu listed in Table 1 includes substantially the same selection categories as the "Copier" mode of the basic menu. However, the "Facsimile" mode of the basic operating menu also includes selection category III "Telephone Numbers" comprising command options 1–8. This feature of the basic menu allows the user to automatic dial from up to eight telephone numbers stored in the memory 22 of the device 12. The features of the basic command menu listed in Table 1 are merely examples of the type of features which may be available in the basic operating menu of the device 12. In alternate embodiments, the basic operating menu of the image transfer device may include more features or fewer features depending on device characteristics such as available memory space, capabilities of the CPU and size and type of the display. The CPU 20 has sufficient processing capacity and the memory 22 of the device 12 has sufficient size to effect the command features of the basic operating menu without using the processing power and memory of the computer 14.

As stated previously, in the present invention, the image transfer device 12 may also be operated remotely from the computer 14 to perform one or more image transfer operations corresponding to command features of the basic operating menu listed in Table 1. The computer 14 has a basic program 220 for remote operating the image transfer device 12 stored in the memory 34 of the computer. This remote basic operating program has a module 222 which defines a remote basic operating menu available for display by the computer processor 32 on the computer display 46. The remote basic operating program 220 also includes a program module 224 which provides instructions to the computer processor 32 for communicating commands to the CPU 20 so that the CPU 20 may control operations of the device 12 according to selected commands of the remote basic operating menu. In the preferred embodiment, the program in module 224 does not provide the CPU 20 with complete program instructions for controlling operation of the device, but rather identifies to the CPU 20 the respective instructions in program module 204, within the device memory 22, which correspond to the remote menu selection on the computer 14.

One example of the features of the remote basic operating menu available for display by the computer processor 32 on the computer display 46 are listed in Table 2 below.

TABLE 2

| 0. INITIALIZATION | |
| --- | --- |
| 1. INITIALIZE | 2. TERMINATE |

| I. MODE | |
| --- | --- |
| 1. COPIER | 2. FACSIMILE |

| II. ORIGINAL TYPE | II. ORIGINAL TYPE |
| --- | --- |
| 1. AUTO*  2. TEXT  3. PHOTO | 1. AUTO*  2. TEXT  3. PHOTO |

| III. DEFAULTS | III. TELEPHONE NUMBERS | | | |
| --- | --- | --- | --- | --- |
| 1. Paper Size | NO. 1 | NO. 2 | NO. 3 | NO. 4 |
| A. Letter* | NO. 5 | NO. 6 | NO. 7 | NO. 8 |
| B. A4 | | | | |

As can be seen from Table 2, the features of the remote operating menu available for display on the computer display generally correspond to features of the basic operating menu of the image transfer device 12 listed in Table 1. Preferably, the remote basic operating menu in the computer 14 does not include all the command features available in the basic operating menu in the device 12. For example, the remote basic operating menu in the computer 14 includes: selection category I "Mode"; selection category II "Original Type"; and selection category III "Defaults". Selection category I "Mode" comprises command options for: 1) Copier, and 2) Facsimile modes as in the basic operating menu of the image transfer device listed in Table 1. Also, in the remote menu, selection category II "Original Type" includes: command option 1 "Auto"; command option 2 "Text"; and command option 3 "Photo", similar to the features in the basic operating menu. Selection category III "Defaults" in the remote menu, however, includes one command option for "Paper Size" or tray location for instance. Thus, the remote operating menu, listed in Table 2, available for display on the computer display 46 does not have the full range of features of the basic operating menu, listed in Table 1, available for display on the device display 50. Nevertheless, the remote operating menu in the computer 14 generally conforms not only to command options of the device 12 but also to command options of multi-function and single function devices of the prior art. The remote operating menu, listed in Table 2, available for display on the computer display 46 also includes selection category 0 "Initialization", with command options for: 1) "Initializing" and 2) "Termination" of an image transfer operation from the computer 14. The features of the remote command menu listed in Table 2 are merely examples of the type of features which may be available in the menu for remotely operating the image transfer device from the computer 14. In alternate embodiments, the remote operating menu in the computer may include more features or fewer features.

The basic program 220 in the computer 14 for remote operating the image transfer device 12 may be loaded in the computer processor 32 by the user generally at any time. For example, the user may load the remote program 220 when the computer 14 is connected, via cable 36, to the image transfer device 12. The user may also load the program 220 when the computer 14 is not connected to the device 12, but is connected otherwise to multi/single function devices of the prior art either via the LAN (see FIG. 1) or via cable 36. Preferably, the computer processor 32 is programmed to have a "Plug and Play" polling capability. "Plug and Play" polling uses a polling signal which allows the computer processor 32 to sense when the computer 14 is connected to the image transfer device 12 of the image transfer system. The computer 14 may also have communication software (not shown) which indicates to the computer processor 32 that a device is connected to the computer via the LAN.

In accordance with instructions in the remote basic program 220, the computer processor 32 displays the selection categories and command options of the remote menu in program module 222 on the computer display 46 as command buttons and lines 72, 74. The command buttons and lines 72, 74 of the menu on the computer display 46 have indicia to indicate the selection categories and command options corresponding to the respective buttons and lines 72, 74. In addition, the computer processor 32 is programmed to display the command buttons and lines 72, 74 of the remote basic operating menu on the computer display 46 in an enabled mode or a disabled mode. Command buttons and lines displayed in the enabled mode may be selected by the user using the user interface 45 of the computer 14 to remotely operate the device 12. Command buttons and lines displayed in the disabled mode cannot be selected by the user. The command buttons and lines 72, 74 have indicia controlled by the computer processor 32 which indicates to the user whether the buttons or lines are in the enabled or disabled mode. For example, buttons and lines in the disabled mode may be shown in phantom on the computer display 46. When the computer processor 32 has an indication (i.e. from the "Plug and Play" polling) that the computer 14 is connected via cable 36 to the image transfer device 12, the processor 32 displays the command buttons and lines 72, 74 representing the features of the remote basic operating menu in module 222 in the enabled mode. Preferably, the computer processor also displays the remote menu command buttons and lines 72, 74 in the enabled mode when the computer 14 is connected to multi/single-function devices of the prior art either via the cable 36 or the LAN (see FIG. 1).

In alternate embodiments, the "pop-up" menu may not appear when the computer is connected to the prior art multi/single function devices. The processor 32 displays the remote operating menu command buttons and lines 72, 74 in the disabled mode when the computer processor 32 does not have an indication that the computer 14 is connected to an image transfer device.

Image transfer operations corresponding to the features listed in Table 2 of the remote basic operating menu in module 222 are generally performed by the image transfer device 12 without using the processing and memory capabilities of the computer 14. The CPU 20 receives the initialization and configuration commands from the computer 14, but then performs the remotely commanded image transfer operation without further using the computer memory 34 or the computer processor 32. By way of example, if the user desires to remotely operate the image transfer device 12 in the copier mode from the computer 14, the user loads the remote basic program 220 in the processor 32 and has the processor display the remote basic menu on the computer display 46. Generally, in the case the operating system of the computer 14 has a menu architecture, such as Microsoft "Windows 98"® or "Windows NT"®, the user may load and display the remote basic operating menu in module 222 by merely selecting a corresponding icon on the display 46. After the remote basic operating menu is displayed on the computer display 46, the user then activates the "Copier" mode and the "Initialization" commands by selecting the corresponding command buttons or lines 72, 74 using the computer user interface 45. The computer processor responds to the selection by sending appropriate signals and/or program instructions to the CPU 20 of the device 12 to initiate operating the device 12 in accordance with the selected menu commands. The CPU 20, in turn, initializes the reader 18 (see FIG. 1) of the device 12 to read an image on the sheet medium 100 and sends the image data to the print head 28 for printing on sheet medium 102. The CPU 20 does not use the computer processor 32 or the computer memory 34 to perform the copier operation in this case. The image transfer device 12 may similarly perform facsimile operations commanded remotely from the computer 14 without using the processing and memory capabilities of the computer to effect the image transfer. For example, after remote initialization of the facsimile mode from the computer 14, the CPU 20 may initialize the communication device 30 to dial the appropriate telephone number accessed from the device memory 22 again without using the computer processor 32 or memory 34. In addition, the image transfer features of the remote basic operating menu defined in program module 222 may be performed in a substantially similar manner when the computer is connected to multi/single-function devices of the prior art.

Figure 3:
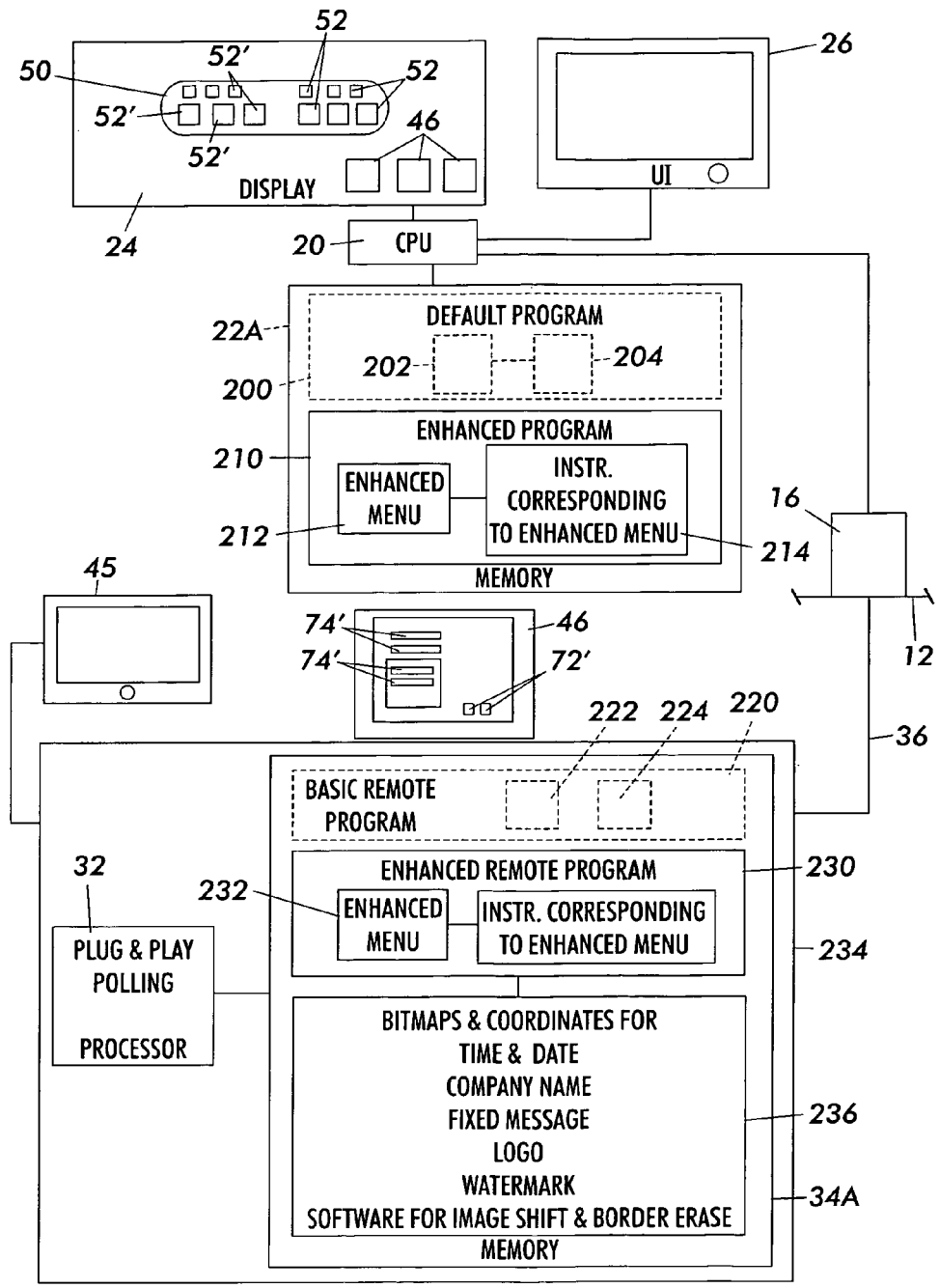
FIG. 3 is a schematic diagram of the computer, and the display, user interface, processor, and memory of the image transfer device of the system shown in FIG. 1, in accordance with one embodiment of the present invention.

Referring now to FIGS. 1 and 3, in accordance with one embodiment of the present invention, an enhanced program 210 is stored in the memory 22A of the device 12. (Similar reference numbers are used in FIGS. 1, 3, and 5 to designate similar features.) The enhanced program 210 includes a program module 212 which defines an enhanced operating menu to be displayed by the CPU 20 on the touch display 50 of the device 12. The enhanced program 210 also includes a program module 214 embodying instructions for the CPU 20 to control the image transfer device 12 corresponding to the commands within the enhanced operating menu in program module 212. The enhanced program 210 is available for loading in the CPU 20 when the computer 14 is energized and connected via cable 36 to the connector 16 of the device 12. When the cable 36 is not connected to connector 16, or the computer 14 is not energized, the enhanced program 210 stored in the memory 22A cannot be accessed or loaded in the CPU 20 of the device 12. Thus, the enhanced operating menu defined by program module 212 is available to be displayed by the CPU 20 on the display 50 of the device 12 when the computer 14 is energized and connected to the device 12. Otherwise, the basic operating menu in program module 202 of the default program 200 is available for display by the CPU 20. The device 12 in this case may have a suitable relay (not shown) to signal the CPU 20 that the computer is connected to the device 12 and that the computer is energized. Otherwise, the CPU 20 may receive a signal from the computer processor indicating that the commuter is energized and connected to the device 12.

One example of the features of the enhanced operating menu defined in module 212 are listed in the Table 3 below.

TABLE 3

| I. MODE |
| --- |
| 1. COPIER |

| II. ORIGINAL TYPE | | |
| --- | --- | --- |
| 1. AUTO* | 2. TEST | 3. PHOTO |

| III. MAINTENANCE | | | | |
| --- | --- | --- | --- | --- |
| 1. CLEAN PRINT HEAD | 2. PRINT TEST PAGE | 3. ALIGN PRINT HEAD | 4. RESET PRINTER | 5. INK LEVELS |
| | | | | A. Black |
| | | | | B. Cyan |
| | | | | C. Magenta |
| | | | | D. Yellow |

| IV. PRINT DEMO |
| --- |

| V. DEFAULTS | | | | |
| --- | --- | --- | --- | --- |
| 1. Feature Defaults | 2. Program Time-out | 3. Sleep Mode | 4. Paper Size | 5. Reset Factory |
| A. Save new | A. 60 sec.* | A. 5 min* | A. Letter* | |
| B. Reset | B. 90 sec. | B. 10 min | A. A4 | |

| VI. LANGUAGE | | | | |
| --- | --- | --- | --- | --- |
| Language 1 | Language 2 | Language 3 | Language 4 | Language 5 |

VII. COLLATION
VIII. TIME & DATE STAMP
IX. COMPANY NAME
X. FIXED MESSAGE
XI. LOGO
XII. PAGE NUMBERING
XIII. WATERMARK
XIV. IMAGE SHIFT
XV. BORDER ERASE

| 2. FASCIMILE |
| --- |

| II. ORIGINAL TYPE | | |
| --- | --- | --- |
| 1. AUTO* | 2. TEST | 3. PHOTO |

| III. TELEPHONE NUMBERS | | | | | |
| --- | --- | --- | --- | --- | --- |
| No 1 | No 2 | No 3 | No 4 | No 5 | No 6 |
| No. 7 | No. 8 | No. 9 | No. 10 | No. 11 | No. 12 |

| V. DEFAULTS | | | | |
| --- | --- | --- | --- | --- |
| 1. Feature Defaults | 2. AUTO REDIAL | 2. Program Time-out | 3. sleep Mode | 4. Paper Size |
| A. Save new | A. 3 min* | A. 60 sec.* | A. 5 min* | A. Letter* |
| B. Reset | B. 5 min | B. 90 sec | B. 10 min | B. A4 |

TABLE 3-continued

| I. MODE |
| --- |

| VI. LANGUAGE | | | | |
| --- | --- | --- | --- | --- |
| Language 1 | Language 2 | Language 3 | Language 4 | Language 5 |

| VII. COLLATION |
| --- |
| VIII. TIME & DATE STAMP |
| IX. COMPANY NAME |
| X. FIXED MESSAGE |
| XI. LOGO |
| XII. PAGE NUMBERING |
| XIII. WATERMARK |
| XIV. IMAGE SHIFT |
| XV. BORDER ERASE |

The features of the enhanced operating menu listed in Table 3 are exemplary of the type of features which may be otherwise available to an image transfer device. In alternate embodiments, the enhanced operating menu of the device may include a greater or a fewer number of features than those listed in Table 3. As can be seen from Table 3, the enhanced operating menu of the image transfer device 12 of the present invention has extended features which are not included in the basic operating menu listed in Table 1 or the remote basic operating menu listed in Table 2. The enhanced menu, preferably, also includes generally all the features of the basic operating menu. In alternate embodiments, the enhanced menu may include only some of the features in the basic operating menu of the device. The extended features of the enhanced operating menu include: selection category VII "Collation"; selection category VIII "Time & Date" stamp; selection category IX "Company Name"; selection category X "Fixed Message"; selection category XI "Logo"; selection category XII "Page numbering"; selection category XIII "Watermark"; selection category XIV "Image Shift; and selection category XV "Border Erase". The number of programmable telephone numbers has also been expanded in comparison to the basic operating menu. The enhanced operating menu may further include a computer printer and a scanner operating mode not shown in Table 3. Referring still to FIGS. 1 and 3, the extended selection categories of the enhanced operating menu appear on the device display 50 as command buttons 52'. Command buttons 52 in the display 50 continue to represent the selection categories of the basic operating menu which are repeated in the enhanced menu being displayed.

In this embodiment of the present invention, some data used to effect image transfer with device 12 according to the enhanced menu features is stored in the memory 34A of the computer 14. By way of example, such data may include bitmaps in module 236 representing time and date stamps, fixed messages, logos or watermarks to be added to the images as well as the coordinates for printing the bitmaps on sheet medium 102 (see FIG. 1). In addition, software for manipulating the image data to effect an image shift or border erase operation may be stored in the computer memory 34. Furthermore, telephone numbers in excess of the numbers provided with the basic operating menu may also be stored in the computer memory 34A. The device 12 lacks adequate CPU capacity and memory to perform the extended features of the enhanced menu listed in Table 2. Therefore, when an image transfer is to be performed according to an extended function of the device 12, the CPU 20 interfaces with the computer 14 to use the processor 32 and memory 34A of the computer 14.

The image transfer device 12 may be operated remotely from the computer 14 to perform the extended features of the enhanced operating menu. The computer 14 has an enhanced program 230 for remote operating the device 12 stored in the memory 34A. Similar to the remote basic operating program 220, the enhanced remote operating program 230 has a module 232 which defines the extended features of the enhanced menu available for display by the computer processor 32 on the computer display 46. The remote enhanced operating program 230 also has a program module 234 which provides instructions to the computer processor 32 for communicating the extended commands of the enhanced menu to the CPU 20 of the device 12.

One example of the features of the of the remote enhanced operating menu available for display on the computer display 46 are listed in Table 4 below.

TABLE 4

| INITIALIZATION | |
| --- | --- |
| 1. INITIALIZE | 2. TERMINATE |

| I. COLLATION | |
| --- | --- |
| II. TIME & DATE STAMP | |
| 1. Placement | 2. Edit |
| III. COMPANY NAME | |
| 1. Placement | 2. Edit |
| IV. FIXED MESSAGE | |
| 1. Placement | 2. Edit |
| V. LOGO | |
| 1. Placement | 2. Edit |
| VI. PAGE NUMBERING | |
| 1. Placement | |
| VII. WATERMARK | |
| 1. Placement | 2. Edit |
| VIII. IMAGE SHIFT | |
| 1. X Shift | 2. Y Shift |
| IX. BORDER ERASE | |
| 1. Border Width Adjustment | |

The features listed in. Table 4 are merely examples of the type of features which may otherwise be included in the enhanced menu for remotely operating the image transfer device from the computer. In alternate embodiments, a greater or smaller number of features may be included. The remote enhanced operating menu defined in module 232 includes: selection category 0 "Initialization"; selection category I "Time & Date Stamp"; selection category II "Collation"; selection category III "Company Name"; selection category IV "Fixed Message"; selection category V "Logo"; selection category VI "Page Numbering"; selection category VII "Watermark"; selection category VIII "Image Shift"; and selection category IX "Border Erase". The computer processor displays the selection categories of the remote enhanced menu on the computer display as command buttons and lines 72', 74'. In the preferred embodiment, the computer processor is programmed to display the remote enhanced operating menu in module 232 on a different screen or "window" of the display 46 from the remote basic operating menu in module 222. In alternate embodiments, the structure of the remote enhanced operating menu may allow its features to be displayed alongside the features of the remote basic operating menu.

As can be seen from a comparison of Tables 3 and 4, the features (e.g. selection categories I–IX in Table 4) of the remote enhanced operating menu in computer program module 232 are substantially the same as the extended features (e.g. selection categories VII–XV in Table 3) of the enhanced operating menu in program module 212 of the device 12. The user may thus operate the image transfer device 12 directly or remotely from the computer 14 to perform image transfers in accordance with the extended features of the enhanced operating menu. The remote enhanced program 230 in the computer 14 is preferably linked to the program module 236 holding the data used in effecting the extended features of the enhanced operating menu of the device 12. This allows the computer processor 32 to display the stamps, logos, fixed messages and watermarks defined by the bitmaps in module 236 on the computer display 46. Preferably, the user may view these items on the computer display 46 when the remote enhanced operating menu is displayed. The remote enhanced menu displayed on the computer display 46 may include command buttons (not shown) which upon selection by the user allow the user to view the stamps, logos, fixed messages and watermarks in module 236. Additional command buttons (not shown) may also be provided in the menu to allow the user to designate the coordinates for printing the bitmaps on sheet medium. The processor 32 may also be programmed to allow the user to edit the bitmaps forming the messages, logos and watermarks. Also, command buttons (not shown) may be provided on the displayed menu to adjust the border width for the "Border Erase" feature or the shift dimensions for the "Image Shift" features of the enhanced menu. The modified data of module 236 may be stored in the computer memory 34 or used by the computer processor 32 and the CPU 20 to effect image transfer operations of the device according to the extended features of the enhanced operating menu in Tables 3 and 4.

In the preferred embodiment, the remote enhanced operating menu, listed in Table 4, generally does not duplicate the features of the remote basic operating menu listed in Table 2. This is because, the remote basic operating menu in module 222 remains available for display on the computer display 46 and its features may be selected when the device CPU 20 is using the enhanced operating menu listed in Table 3. For example, as described previously, the enhanced operating program 210 is loaded in the CPU 20 of the device 12 when the computer cable 36 is connected to the connector 16. To effect a basic image transfer operation of the device 12 such as copying (e.g. command option 1. "Copier" in Table 3) from the computer 14, the user loads the remote basic operating menu of module 222 in the computer processor 32. The computer processor 32, upon sensing that the computer 14 is connected to the device 12, displays the command buttons or lines 72, 74 of the remote basic operating menu on the computer display 46 in the enabled mode. The user selects the command button or line 72, 74 corresponding to the copier command of the remote menu (e.g. command option 1) "Copier" in Table 2) which initiates the copying operation of the device 12 in a manner substantially similar to that described previously with respect to operating the device 12 with the remote basic operating menu. In alternate embodiments, the remote enhanced menu in the computer may include one or more of the features of the remote basic operating menu listed in Table 2.

The remote enhanced program 230, preferably, may be loaded in the computer processor 32 generally at any time. Hence, the remote enhanced operating menu in module 232 is available for display on the computer display 46 both when the computer 14 is connected to the device 12 via cable 36, and when the computer is not connected to the device. When the computer processor 32 senses (i.e. with "Plug and Play" polling) that the computer 14 is connected to the device 12, the computer processor 32 displays the command buttons and lines 72', 74' of the remote enhanced operating menu in an enabled mode. This allows the user to select the command features of the remote enhanced operating menu using the user interface 45 of the computer 14. When the computer 14 is not connected to the device 12, or is connected to a multi/single function device of the prior art, the computer processor 32 displays the command buttons and lines 72', 74' of the remote enhanced operating menu on the computer display in the disabled mode. The user cannot select the command buttons and lines 72', 74' of the enhanced menu when displayed in the disabled mode. In alternate embodiments, the computer processor may be programmed not to display the remote enhanced operating menu when the computer is not connected to the image transfer device or is otherwise connected to multi/single function devices of the prior art.

Figure 4:
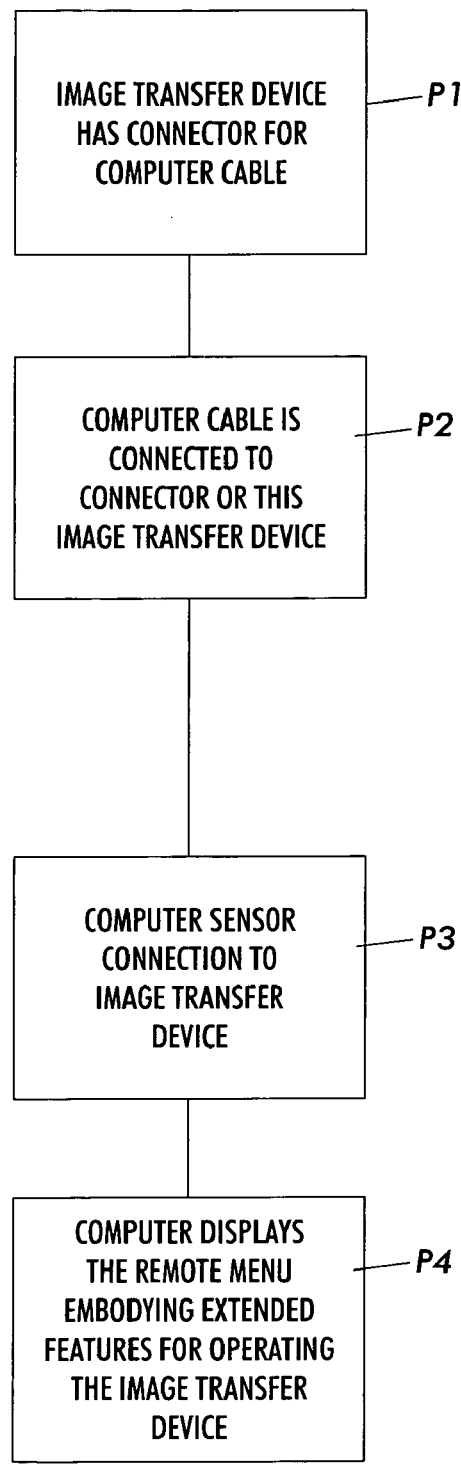
FIG. 4 is a flow chart which graphically illustrates a method for providing the image transfer device with an enhanced operating menu with extended functions in accordance with the present invention.

FIG. 4 is a flow chart which graphically illustrates a method in accordance with the present invention for providing extended features to the image transfer device 12. As noted in block P1 of the flow chart in FIG. 4, the device 12 has connector 16 (see also FIG. 3) to which the computer cable 36 is connected in block P2 of FIG. 4. In block P3, the computer processor 32 senses (with the "Plug and Play" polling) that the computer 14 is connected to the device 12. This allows the computer processor 32, in block P4 of FIG. 4, to display the features of the remote enhanced operating menu in module 232 on the computer display 46 in the enabled mode. The user may then use the computer user interface 45 to select the enabled command buttons and lines 72', 74' in order to remotely operate the device 12 and effect the desired extended feature of the enhanced operating menu listed in Table 3. By way of example, in the case where the copier mode of the device 12 is selected and the user wishes to add a fixed message, such as "Confidential Document" to the copied image printed by the device 12, the user uses the computer interface 45 to select the appropriate command buttons 72' (see FIG. 3) representing the "Fixed Message" and "Initializing" features (selection category IV and 0 in Table 4) of the remote enhanced operating menu. Activation of the command buttons 72' causes the computer processor 32 to transmit a signal to the CPU 20 of the device 12. The CPU 20 then accesses the program instructions from the operating program 202 corresponding to the selected extended features and initiates device operation. In this case, the CPU 20 of the device 12 may upload the bitmap and printing coordinates for the message "Confidential Document" stored in the computer memory 34A. The CPU 20 then merges the bitmap with the image data from the reader 18 of the device 12 such that the image printed by the print head 28 on the sheet medium 102 includes the message "Confidential Document" in the desired location. A similar method may be used to add the time and date stamp, a company name, a logo or a watermark to images being transferred from the reader 18 to the print head 28 of the image transfer device 12. In the case the "Image Shift" or the "Border Erase" features are selected on the computer 14, the CPU 20 uploads the coordinates indicating where the image is to be shifted of the border width to be deleted when the image is printed. Bitmaps may also be added in a substantially similar manner to images received by the communication device 30 (see FIG. 1) over communication line 302 which are to be printed by the device 12. The uploaded information may stay with the device 12 even if the computer is de-energized or is disconnected from the connector 16.

Figure 5:
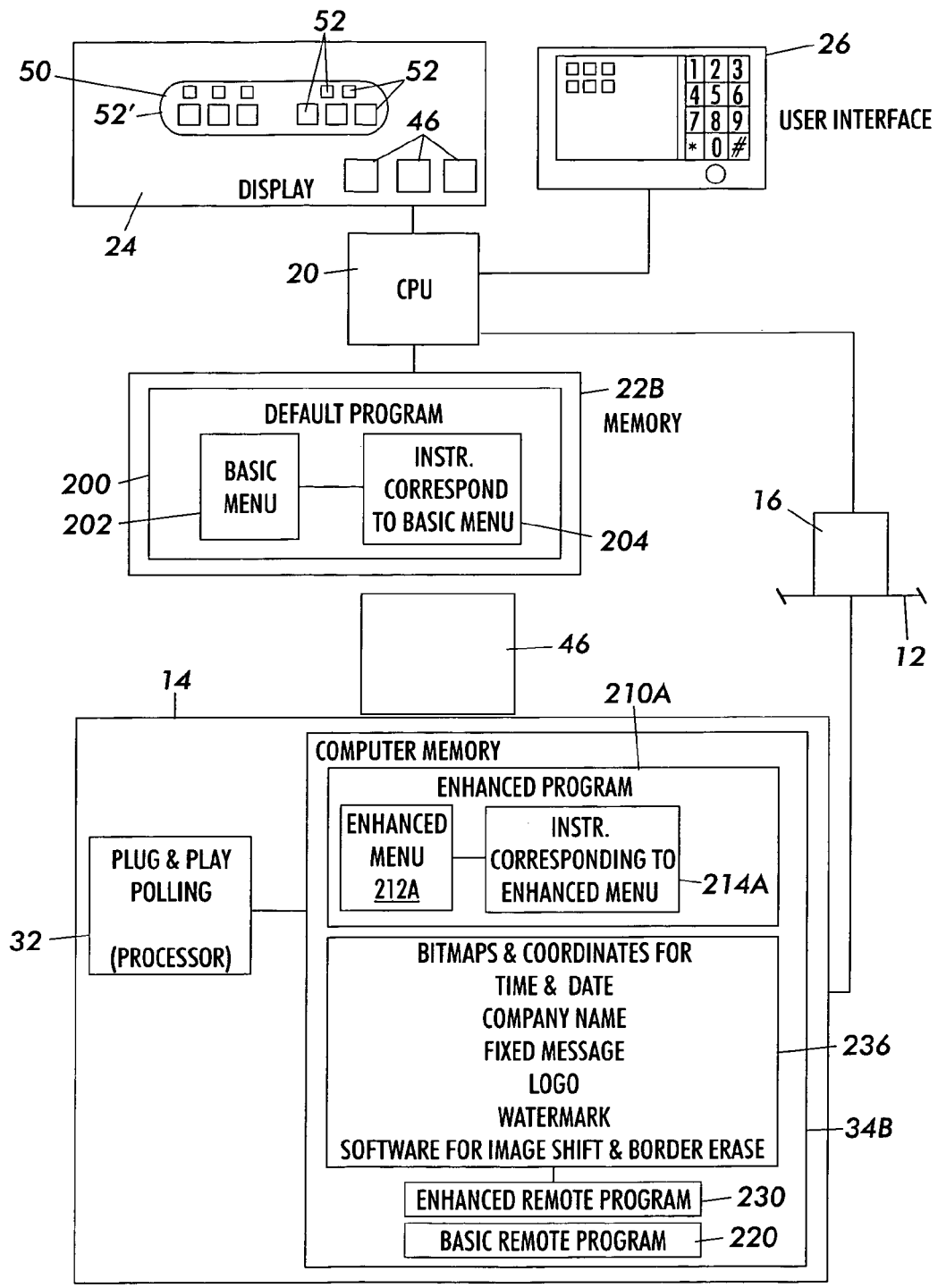
FIG. 5 is a schematic diagram of the computer, and the display, user interface, processor, and memory of the image transfer device of the system shown in FIG. 1, in accordance with a second embodiment of the present invention.

Referring now to FIGS. 1 and 5, in accordance with a second embodiment of the present invention, the enhanced program 210A, including the module 212A for displaying the enhanced menu on the device display 50 and the module 214A with program instruction for operating the device 12, are stored in the computer memory 34B. Otherwise, the second embodiment of the present invention is substantially the same to the first embodiment shown in FIGS. 1 and 3. The enhanced operating menu in program module 212A has substantially the same features as listed in Table 3. As in the first embodiment, the remote basic and enhanced operating programs 220, 230 for remote operation of the device 12 from the computer 14 remain stored in the computer memory 34B. The enhanced program 210A for operating the device 12, is uploaded by the computer processor 32 to the CPU 20 of the device when the computer processor receives an indication that the computer 14 is connected to the device. The computer processor 32 uploads the program module 212A which defines the enhanced operating menu, listed in Table 3, making it available for display on the device display 50. The program instructions in program module 214A for operating the device 12 in accordance with the extended image transfer command options of the enhanced operating menu are also uploaded, at least in part, by the computer processor 32 to the device CPU 20. Remote operation of the image transfer device 12 from the computer 14 in accordance with the extended features of the enhanced operating menu of the device is substantially the same as previously described with regards to the first embodiment of the present invention. Generally, the user opens the remote enhanced operating menu on the computer display 46 and selects the desired extended features as well as the device initialization feature from the command buttons and lines 72', 74' on the display (see FIG. 3).

Figure 6:
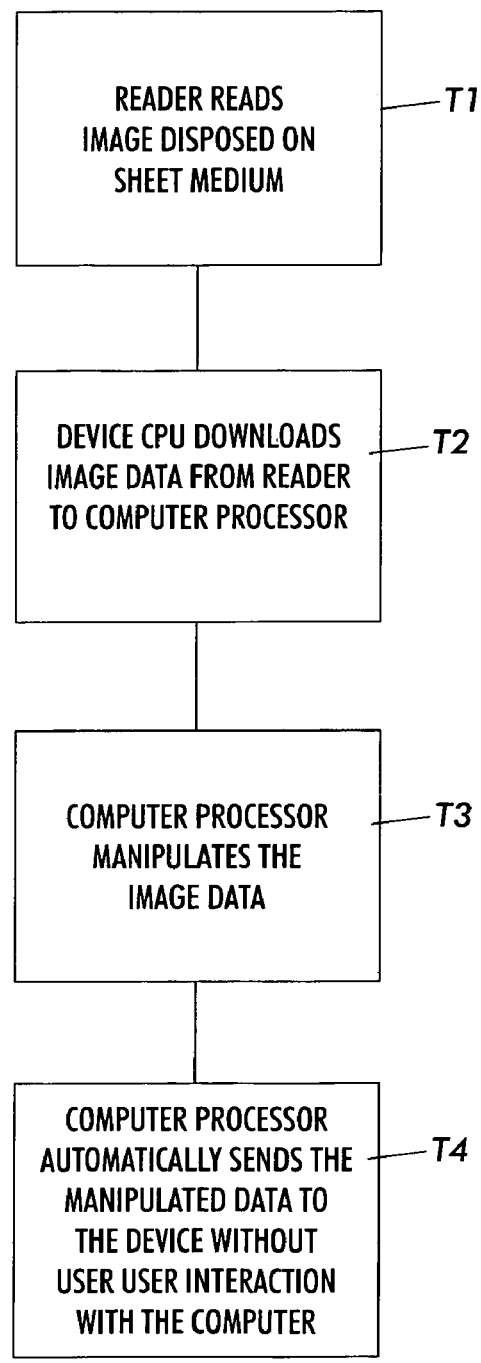
FIG. 6 is a flow chart which illustrates an image transfer procedure performed with the image transfer system shown in FIG. 1 in accordance with the present invention.

In this embodiment, the device CPU 20 may use the computer processor 32, and memory 34B to effect the extended image transfer functions in the enhanced operating menu listed in Table 3. FIG. 6 is a flow chart which illustrates a procedure wherein the CPU 20 effects one or more of the extended image transfer command options of the enhanced operating menu of the image transfer device 12. In block T1, the reader 18 (see also FIG. 1) is operated by the CPU 20 to read an image disposed on sheet medium 100. The CPU 20, in block T2 of FIG. 6, downloads the image data from the reader 18 to the computer processor 32. In conjunction with this, computer processor 32 recognizes the extended command options of the enhanced menu to be performed. By way of example, the user may select from the remote enhanced menu to operate the device 12 in the copier mode with collation of copies (selection category I in Table 4), and activates the appropriate command buttons on the computer display 46 using the computer interface 45. The user also selects the "Initializing" command button on the display 46. The computer processor 32 recognizes the selection entered by the user on the interface 45. In response, the computer processor 32 signals the CPU 20 to initialize the reader 18 of the device 12. The computer processor 32 also recognizes that the collating function is to be performed. Upon receiving the image data downloaded by the CPU 20 in block T2, the computer processor 32 in block T3 of FIG. 6, automatically manipulates the image data in a manner consistent with effecting the image transfer function selected by the user. Then in block T4 of FIG. 6, the computer processor 32 automatically sends the now manipulated data back to the device 12 without user interaction. The CPU 20 routes the manipulated data to the print head 28 of the device 12 for printing on sheet medium 102, or to the communication device 30. For example, in the case of the collating function mentioned above, in the step corresponding to block T3 of FIG. 6, the computer processor 32 automatically stores the series of images read by the reader 18 and then generates sequential copies of the series of images in order to form a collated series of images in electronic form. This step is performed by the processor 32 without user interaction to create the collated images. Then in the step corresponding to block T4 of FIG. 6, computer processor 32 automatically sends each series of images to the print head 28 of the device 12 also without user interaction. Each series of images received by the print head 28 is printed on sheet medium 102 to form printed collated images. In the case where the user chooses from the remote enhanced menu on display 46 to add a fixed message to printed copies, the computer processor 32, in the step corresponding block T3 of FIG. 6, automatically merges the bitmap for the fixed message from the computer memory 34B with the image data downloaded from the reader 18 (see FIG. 1). The computer processor 32 automatically accesses the bitmap from the memory 34B and merges the bitmap with the image data without user interaction. If the user chooses an image shift or border erase feature, the computer processor 32, in the step corresponding to block T3 of FIG. 6, automatically shifts the image data electronically in accordance with the shift coordinates in the computer memory 34B or electronically deletes a portion of the image data consistent with the border width in the computer memory. The user enters the image shift coordinates or border width dimension in the computer memory substantially at the same time or prior to initialization of the image transfer process (block T1). The user does not interact with the computer 14 when the data is manipulated (block T3). Thus, the computer processor 32 manipulates the image data to effect the image shift or border erase features without user interaction. The manipulated data is then automatically sent to the print head 28 without user interaction for printing the image and the fixed message on sheet medium 102.

This invention includes pop-up screens on the PC display 46 for selecting the added enhanced menu features rather than using the control panel and display 50 on the device 12. The invention allows the user to be able to interact with the PC user interface 45 in addition to the device UI 26, or alternatively just using the PC interface 45. The remote control has two possible modes of operation; A) initialization of the process (such as copying) and subsequent performance or execution of the process by the device without further interaction with the PC 14 when basic (i.e. non-enhanced) copying is being done, and B) initialization of the process and subsequent performance or execution of the process by the device with interaction with the PC 14 (i.e.: using memory of the PC for enhanced copying such as collating). Initialization or set up merely comprises the "pop-up" menus and the user changing settings via the menus before actual copying starts. Thus, even though the device does not have hardware to perform a task, such as collating, the PC memory can be used to allow the task to be performed. Other PC 14 enhanced features include border erase and image shift (see Tables 3 and 4).

In the present invention there is real-time merging of image modifications during copying or faxing. The original document is scanned by the device, sent to the PC, and sent back to the device for output on a print medium with a modification such as one or more of the annotations (e.g. Time and Date, Company Name, Fixed Message, Logo, Page Number, Watermark and/or Border Erase and/or Image Shift and/or others). The modification is selected before copying starts and, thus, occurs automatically during copying in a real-time manner. The PC enabled image modification extended feature occurs in the middle or during the copying process. Similarly, during faxing an image modification can occur wherein the document is scanned by the device, sent to the PC where it is modified, and then sent back to the device for transmission out its modem as a real-time automatic process.

In accordance with the present invention, the user has a multi-function (MF) device 12 with a PC 14 connected to the device. There isn't sufficient memory in the multi-function device alone to perform collation, but because the multi-function device 12 is attached to the PC 14, the user can scan the information on the MF reader 18 and send the scanned data to the PC 14 to collate and reformat the document as a collated set of prints. The PC 14 then sends the new instructions back to the MF device print head for printing. The device 12 is "smart" enough to know it has extra capabilities because a PC is attached to it. And all device capabilities, including those extra capabilities are visible/available at on the computer display 46 and selectable using the PC user interface 45.

One of the significant cost factors in the manufacture of multi-function devices has been the cost of memory. In order to provide the multi-function devices of the prior art with the ability to perform extended functions, such as collating, pagination, or addition of logos or messages, the size of the internal memory was increased with a resultant significant increase in the cost of the devices. To reduce the cost of the devices in the prior art, the internal memory size was cut which limited the capabilities of the low cost devices to performing only basic functions such as mere copying or faxing without any enhancement. In other words, in the prior art low cost meant small memory, and hence, only basic functions. One of the significant advantages of the present invention is that it solves the cost versus features conundrum by borrowing the processing power and memory capacity of a PC 14 to extend and enhance the functions of the multi-function device 12. In addition, in the present invention, the user can perform all these tasks from his or her computer station. The present invention eliminates the need for larger memory in the devices 12, thereby allowing the cost of the devices 12 to remain small in comparison to multi-function devices of the prior art which a capable of performing similar extended or enhanced functions. Furthermore, the present invention provides unparalleled flexibility in operating the multi-function device by allowing the user to access and operate the extended functions of the device from the computer terminal. Such flexibility is unavailable in low cost devices of the prior art. With the image transfer system of the present invention, the user merely initializes the device from his computer station and need not interrupt his work in order to make copies and/or send a fax with enhanced information thereon.

In accordance with the present invention, the multi-function device 12 has the capability to operate as a stand alone device when not connected to the computer 14 to perform copier and facsimile functions as listed in Table 1. In this case, the "pop-up" menus (i.e. the remote basic and enhanced operating menus in Tables 2&4) may be available for display on the computer display 46 with the command options disabled. Alternatively, the "pop-up" menus may not be available for display by the computer 14. When the computer 14 is connected to MF devices of the prior art, the "pop-up" menus may be available for display on the computer display 46 with the command options disabled or, in the alternative, the "pop-up" menus may not be available for display on the computer 14. In the case where the multi-function device 12 of the present invention is connected to a computer of the prior art without the programming of the present invention, the enhanced operating menu listed in Table 3 becomes available to be displayed on the display 50 of the device 12. Here, the device 12 can be operated to perform the extended and enhanced features of the enhanced menu such as addition of time and date stamp, fixed messages, and collating for example. To perform these functions, the device 12 can be operated using the device user interface but not the computer, because the computer of the prior art does not have the programming and cannot display the remote basic, or enhanced "pop-up" menus for operating the device 12. In the case where the MF device 12 is connected to the computer 14 of the present invention, the basic and enhanced "pop-up" menus for operating the device 12 are available for display on the computer display 46 with the command options enabled. This allows the user to remotely operate the device using the user interface 45 of the computer 14 to perform the basic and enhanced features of the multi-function device 12.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An image transfer system for transferring an image from a first medium, the image transfer system comprising:
    an image transfer apparatus having a scanner for scanning the image on the first medium, and a display; and
    a computer removably connected to the image transfer apparatus, the computer having a computer display, and an image transfer apparatus operating menu available for display on the computer display when the computer is not connected to the transfer apparatus;
    wherein, when the computer is connected to the image transfer apparatus, the computer has selectable features of an operating menu of the image transfer apparatus available for display on the computer display, and wherein at least one of the features is unavailable for selection in the image transfer apparatus operating menu available for display on the computer display when the computer is not connected to the transfer apparatus,
    wherein the operating menu of the image transfer apparatus is an enhanced operating menu of the apparatus, the enhanced operating menu being enabled for operating the apparatus when the computer is connected to the apparatus,
    wherein the selectable features are extended features of the enhanced operating menu of the image transfer apparatus, and wherein the extended features are not included in a default operating menu of the image transfer apparatus, the default operating menu of the apparatus being enabled for operating the apparatus when the computer is not connected to the apparatus,
    wherein the extended features are related to image transfer operations of the image transfer device in which computer resources are used to allow the image transfer device to effect the image transfer operations.

2. An image transfer system in accordance with claim 1, wherein a portion of the operating menu of the image transfer apparatus is stored in the computer and uploaded to the apparatus when the computer is connected to the apparatus, the portion of the operating menu of the apparatus stored in the computer comprising the selectable features of the operating menu available for display on the computer display.

3. An image transfer system in accordance with claim 1, wherein the operating menu of the image transfer apparatus is stored in a memory of the image transfer apparatus, and wherein the computer has software for displaying the selectable features of the operating menu of the apparatus on the computer display.

4. An image transfer system in accordance with claim 1, wherein the computer is adapted for sending a polling signal to determine if the computer is connected to the image transfer apparatus, and wherein the computer is programmed for enabling the selectable features to be available for display on the computer display when the computer receives an indication from the polling signal that the computer is connected to the apparatus.

5. An image transfer system in accordance with claim 1, wherein the computer has a user interface adapted for allowing a user to select selectable features displayed on the computer display.

6. An image transfer system in accordance with claim 1, wherein the selectable features comprise at least one of a feature for collating copies, a feature for adding a logo, a feature for adding a message, a feature for adding page numbering, or a feature for adding a watermark.

7. An image transfer system in accordance with claim 1, wherein the selectable features comprise at least one of a feature for effecting an image shift, or a feature for deleting a border.

8. An image transfer system in accordance with claim 1, wherein the image transfer apparatus is at least one of a copier, a fax machine, or a printer.

9. In an image transfer system comprising an image transfer device and a computer removably connected to the image transfer device, the image transfer device having a reader for reading an image on a medium, and the computer having a user interface and a computer display, wherein the improvement comprises:

when the computer is connected to the image transfer device the computer has a first image transfer device operating menu with selectable features for operating the image transfer device available for display on the computer display, the user interface of the computer being adapted to allow a user to select the selectable features displayed on the computer display, and wherein when the computer is not connected to the image transfer apparatus the computer has a second image transfer device operating: menu available for display on the computer display with at least one of the selectable features of the first menu being unselectable in the second menu wherein the selectable features on the computer display are extended features of an enhanced operating menu of the image transfer device, and wherein the image transfer device has the enhanced operating menu enabled for operating the image transfer apparatus when the computer is connected to the mage transfer device, wherein the enhanced operating menu of the image transfer device has extended functions in comparison to a basic operating default menu of the image transfer device, and wherein the basic operating default menu of the device is enabled for operating the device with the extended features unavailable when the computer is not connected to the device, wherein the extended features are related to image transfer operations of the image transfer device in which computer resources are used to allow the image transfer device to effect the image transfer operations.

10. An image transfer system in accordance with claim 9, wherein image transfer device has a memory for storing software embodying the extended features of the enhanced operating menu, and wherein the computer has software for displaying the extended features on the computer display.

11. An image transfer system in accordance with claim 9, wherein the selected features available for display on the computer display include at least one of a feature for collating copies, a feature for adding a logo, a feature for adding a message, a feature for adding page numbering, a feature for adding a watermark, a feature for effecting an image shift, or a feature for deleting a border.

12. An image transfer device for transferring an image from a medium, the device comprising:

a controller;

a reader operably connected to the controller for reading the image on the medium; and a connector connected to the controller for connecting a computer to the image transfer device;

wherein, extended features of an enhanced operating menu of the image transfer device are available to be displayed on a computer display, the extended features being in addition to default menu features, both being accessible for selection by a user from the computer display when the computer is connected to the connector, and a default operating menu of the image transfer device being available for display on the computer, with the extended features being displayed but inaccessible for selection by the user from the computer display when the computer is not connected to the connector, and wherein the extended features are related to image transfer operations of the image transfer device in which computer resources are used to allow the image transfer device to effect the image transfer operations.

13. An image transfer device in accordance with claim 12, wherein the device further comprises a memory for storing the enhanced operating menu of the device, and wherein the computer has software enabling the extended features of the enhanced operating menu to be displayed on the computer display.

14. An image transfer device in accordance with claim 12, wherein the extended features include at least one of a feature for collating copies, a feature for adding a logo, a feature for adding a message, a feature for adding page numbering, a feature for adding a watermark, a feature for effecting an image shift, or a feature for deleting a border.

15. A method for enhancing operating features of an image transfer device, the method comprising the steps of:

providing the image transfer device with a connector for connecting a computer to the image transfer device;

connecting the computer to the image transfer device, the computer having a computer display, and a user interface; and with the computer, displaying extended features of an enhanced operating menu for operating the image transfer device on the computer display;

wherein and replace with "a default operating menu is displayed in which the default menu features are displayed and selectable, and the extended features are displayed but" of the enhanced operating menu of the image transfer device are selectable by a user using the user interface of the computer when the computer is connected to the image transfer device, and wherein, the extended features are unselectable by the user using the user interface when the computer is not connected to the image transfer device, the extended features being related to image transfer operations of the image transfer device in which computer resources are used to allow the image transfer device to effect the image transfer operations.

16. A method in accordance with claim 15, wherein the extended features include at least one of feature for collating copies, a feature for adding a logo, a feature for adding a message, a feature for adding page numbering, a feature for adding a watermark, a feature for effecting an image shift, or a feature for deleting a border.

* * * * *

UNITED STATES PATENT AND TRADEMARK OFFICE
CERTIFICATE OF CORRECTION

PATENT NO. : 7,111,250 B1
APPLICATION NO. : 09/364630
DATED : September 19, 2006
INVENTOR(S) : Ken Hayward et al.

It is certified that error appears in the above-identified patent and that said Letters Patent is hereby corrected as shown below:

In the claims

Claim 9, col. 21, line 57:

replace:     "operating: menu"

with:     --operating menu--

Claim 15, col. 23, lines 4-11:

replace:     "wherein and replace with "a default operating menu is displayed in which the default menu features are displayed and selectable, and the extended features are displayed but" of the enhanced operating menu of the image transfer device are selectable by a user using the user interface of the computer when the computer is connected to the image transfer device, and wherein, the extended features are unselectable by the user using"

with:     --wherein the extended features of the enhanced operating menu of the image transfer device are selectable by a user using the user interface of the computer when the computer is connected to the image transfer device, and wherein, a default operating menu is displayed in which the default menu features are displayed and selectable, and the extended features are displayed but are unselectable by the user using--

Signed and Sealed this
Seventeenth Day of May, 2016

Michelle K. Lee
*Director of the United States Patent and Trademark Office*